US011426988B2

(12) United States Patent
Yuan et al.

(10) Patent No.: US 11,426,988 B2
(45) Date of Patent: Aug. 30, 2022

(54) LIFTING DEVICE FOR A TABLE OF A LITHO LAMINATING MACHINE

(71) Applicant: BOBST GRENCHEN AG, Grenchen (CH)

(72) Inventors: Zheng Yuan, Jiangsu (CN); Thuc-Binh Phan, Solothurn (CH); Maurizio Gugel, Malleray (CH)

(73) Assignee: BOBST GRENCHEN AG, Grenchen (CH)

(*) Notice: Subject to any disclaimer, the term of this patent is extended or adjusted under 35 U.S.C. 154(b) by 0 days.

(21) Appl. No.: 17/421,339

(22) PCT Filed: Jan. 18, 2019

(86) PCT No.: PCT/CN2019/072296
§ 371 (c)(1),
(2) Date: Jul. 7, 2021

(87) PCT Pub. No.: WO2020/147100
PCT Pub. Date: Jul. 23, 2020

(65) Prior Publication Data
US 2022/0063257 A1    Mar. 3, 2022

(51) Int. Cl.
B32B 41/00    (2006.01)
B32B 37/00    (2006.01)
B31F 1/20     (2006.01)
B32B 29/08    (2006.01)

(52) U.S. Cl.
CPC .......... B32B 37/0046 (2013.01); B31F 1/20 (2013.01); B32B 29/08 (2013.01)

(58) Field of Classification Search
CPC ........ B32B 37/0046; B32B 29/08; B31F 1/20

USPC ................. 156/60, 64, 350, 351, 378, 379
See application file for complete search history.

(56) References Cited

U.S. PATENT DOCUMENTS

2018/0099471 A1* 4/2018 Baierl ................. B31F 1/2818

FOREIGN PATENT DOCUMENTS

| CN | 201390549 Y | 1/2010 |
| CN | 101695878 A | 4/2010 |
| CN | 201587832 U | 9/2010 |
| CN | 201647721 U | 11/2010 |
| CN | 102910557 A | 2/2013 |
| CN | 203341965 U | 12/2013 |
| CN | 103832767 A | 6/2014 |
| CN | 205471423 U | 8/2016 |

(Continued)

OTHER PUBLICATIONS

International Search Report dated Oct. 14, 2019, in counterpart International Patent Application No. PCT/CN2019/072296 (2 pages, in English).

Primary Examiner — Michael N Orlando
Assistant Examiner — Joshel Rivera
(74) Attorney, Agent, or Firm — Bookoff McAndrews, PLLC

(57) ABSTRACT

A litho laminating machine has an accelerator table (20), the table (20) being moveable between an operating position and a raised maintenance position, the table (20) being supported on a frame (24) with a bearing (22) defining a pivot axis (P), a lifting device (30, 40) being provided which comprises a spring element (30) biasing the table (20) towards the maintenance position, and an actuator (40) for moving the table (20) from the operating position towards the maintenance position.

18 Claims, 3 Drawing Sheets

(56) References Cited

FOREIGN PATENT DOCUMENTS

| | | |
|---|---|---|
| CN | 106395423 A | 2/2017 |
| CN | 206051123 U | 3/2017 |
| CN | 206733691 U | 12/2017 |
| CN | 108190529 A | 6/2018 |
| CN | 208065657 U | 11/2018 |
| JP | S60167850 A | 8/1985 |

* cited by examiner

LIFTING DEVICE FOR A TABLE OF A LITHO LAMINATING MACHINE

CROSS-REFERENCE TO RELATED APPLICATION(S)

This application is a National Stage under 35 U.S.C. § 371 of International Application No. PCT/CN2019/072296, filed Jan. 18, 2019, the contents of which is incorporated by reference in its entirety.

The invention relates to a litho laminating machine with an accelerator table, the table being moveable between an operation position and a raised maintenance position, with the table being supported on a frame with a bearing defining a pivot axis.

A litho laminating machine laminates printed sheets accurately onto single-faced corrugated board. The accelerator table is used for properly guiding the printed sheets onto the corrugated board or corrugated sheet.

For maintenance of the litho laminating machine, the table (sometimes also referred to as "bridge") needs to be raised towards the maintenance position from time to time. As the table is quite heavy, lifting devices are provided which comprise a motor and a gear, with the gear turning the table around the pivot axis. As the dimensions of the table are quite long and the pivot axis is arranged at one of the ends of the table (and as accordingly there is a significant distance between the pivot axis and the center of gravity of the table), a quite significant torque is required to turn the table towards the maintenance position.

The object of the invention is to provide a lifting device which is more simple.

To this end, the invention provides a lifting device which comprises a spring element biasing the table towards the maintenance position, and an actuator for moving the table from the operating position towards the maintenance position. The invention is based on the concept of combining two different raising actions, namely the permanent raising action of the spring element which constantly biases the table towards the raised maintenance position, and the controllable raising action of the actuator. If the table is to be raised, the actuator is used for overcoming the remaining force which is to be added to the force provided by the spring element so as to pivot the table towards the raised position. It is thus not necessary to provide a single, very heavy and strong raising element as two smaller raising elements are used. Further, the actuator can be arranged in a suitable distance from the pivot axis so that the required force can be kept at a suitable level.

The actuator can in particular be a pneumatic piston which can be controlled with a minimum of control elements. Further, pneumatic pressure is readily available.

Preferably, the actuator engages at the table in a distance from the pivot axis which is a fraction of the distance between the pivot axis and the center of gravity of the table. In particular, the distance between the point of engagement of the actuator and the pivot axis is in the order of 20% to 35% of the distance between the pivot axis and the center of gravity. This distance has proven to be a good compromise between reasonable forces required for raising the table on the one hand, and a short actuating stroke of the actuator, allowing to use a compact actuator.

The angle between the central axis of the actuator and a line passing through the pivot axis and the point of engagement of the actuator is, in the operating position of the table, preferably greater than 90° and in the maintenance position less than 90°. As a result of this geometry, the angle is approximately 90° when the table is in a horizontal position where the force required to raise the table towards the maintenance position is at a maximum.

The spring element can be a gas spring which is a reliable and readily available component.

The gas spring engages at the table preferably at a distance from the pivot axis which is more than twice of the length between the pivot axis and the point of engagement of the actuator. This allows using a spring element having a lower biasing force. The resulting longer stroke which is necessary for the spring element, is typically no problem as spring elements with a long stroke are a standard component in a machinery.

According to an embodiment, the angle between the central axis of the spring element and a line passing through the pivot axis and the point of engagement of the spring element is, in the operating position of the table, less than 90°. This geometry results in a lifting device which has a small footprint.

Preferably, an actuator and a spring element are arranged on each of the lateral sides of the table, resulting in a balanced application of the forces.

The invention will now be described with reference to the enclosed drawings. In the drawings, FIG. 1 shows in a perspective view part of a litho laminating machine having an accelerator table;

An essential component of the litho laminating machine is accelerator table 20 which is mounted by means of schematically shown bearings 22 to a frame 24. Table 20 serves for guiding printed sheets supplied from above a schematically shown operators downwards onto a corrugated board supplied from a position in front of the operator.

Figure 1:
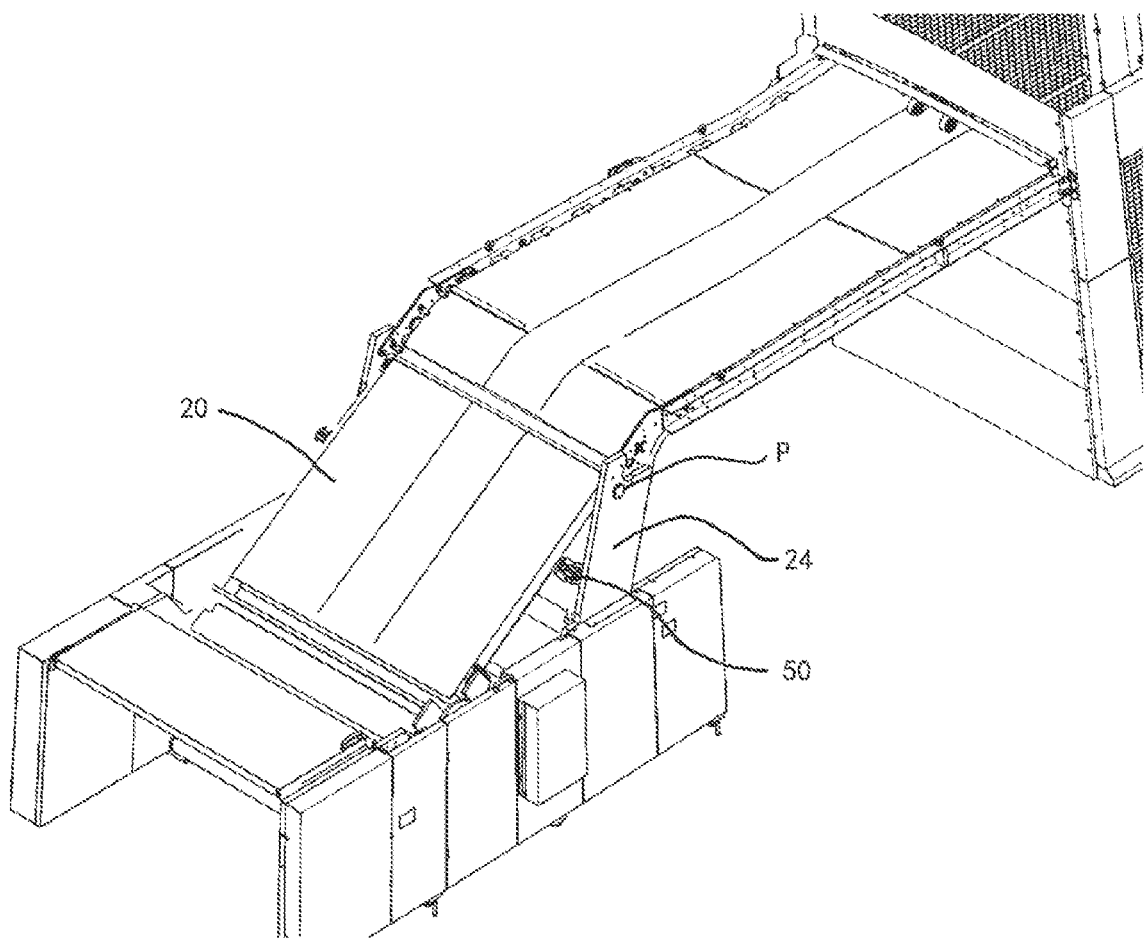
FIG. 1 shows the outlet portion of a litho laminating machine. At the left side, the downstream components for pressing the corrugated board and the printed sheet together, are not shown.
Figure 2:
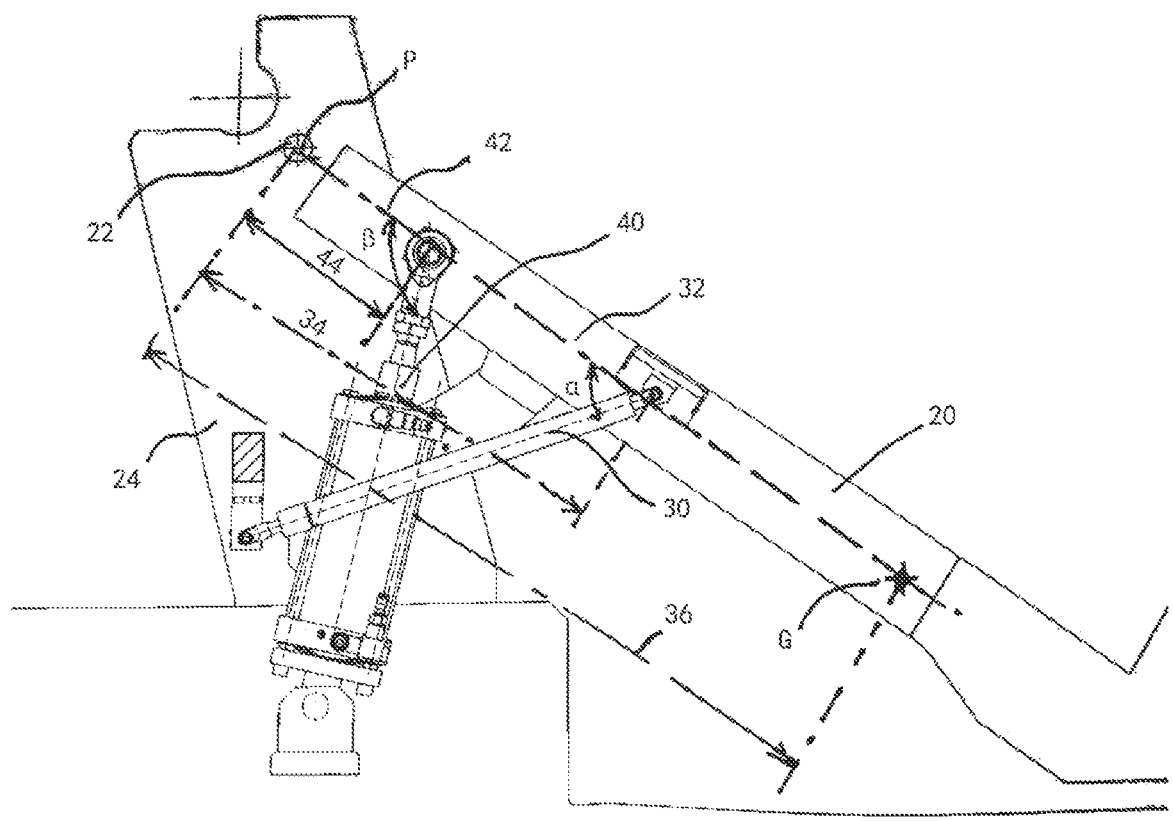
FIG. 2 shows in a side view the table of the machine of FIG. 1 in an operating position together with details of the lifting mechanism.

Bearings 22 in frame 24 define a pivot axis P around which table 20 can be pivoted between an operating position shown in FIGS. 1 and 2, and a maintenance position. As pivot axis P is arranged at the upper end of table 20, almost the entire table (except for the end connected to frame 24) is to be raised in order to transfer table 20 into the maintenance position.

For transferring table 20 from the operating position to the maintenance position, a lifting device is provided. The lifting device here comprises a spring element 30 and an actuator 40.

Spring element 30 is here implemented in the form of a gas spring which on one side is mounted to frame 24 and at the other end is mounted to table 20. It permanently biases table 20 towards the maintenance position.

As can be seen in FIG. 2, an angle α between the longitudinal axis of spring element 30 and a line 32 which runs through pivot axis P and the point of engagement of spring element 30 at table 20, is less than 90° (in the operating position of table 20). In this particular embodiment, angle α is approximately 60°.

The distance 34 between pivot axis P and the point of engagement of spring element 30 at table 20 is shorter than the distance 36 between pivot axis P and the center of gravity G of table 20. In this particular embodiment, distance 34 is approximately 70% of distance 36.

Actuator 40 is here implemented as a pneumatic piston. It is connected with one end to frame 24 and with its other end to table 20. It is preferred that the cylinder is connected to frame 24 while the piston rod is connected to table 20.

The angle β between the central axis of actuator 40 and a line 42 passing through pivot axis P and the point of engagement of actuator 40 at table 20, is larger than 90° (in the operating position of table 20). In this particular embodiment, the angle is close to 120°.

The distance 44 between pivot axis P and the point of engagement between actuator 40 and table 20 here is significantly smaller than distance 36. In this particular embodiment, distance 44 is approximately 30% of distance 36.

Figure 3:
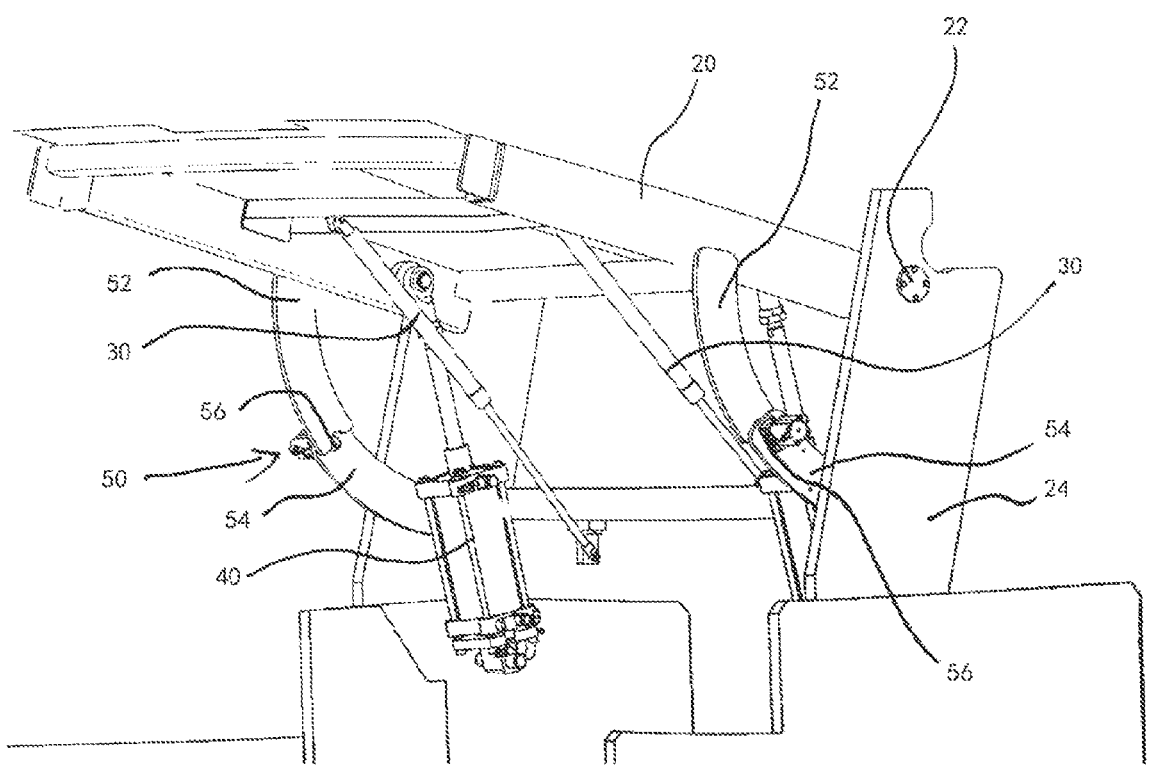
FIG. 3 shows in a perspective view the table of the machine of FIG. 1 in a raised maintenance position.

Even though reference was so far only made to one spring element and to one actuator, it can be seen in FIG. 3 that one spring element 30 and one actuator 40 are arranged at each side of table 20. Thus, two spring elements 30 and two actuators 40 are present.

With the lifting device comprising spring element 30 and actuator 40, table 20 can be transferred from the operating position shown in FIG. 2 into the maintenance position shown in FIG. 3 without requiring significant forces from actuator 40. Spring elements 30 provide some of the force required for lifting table 20, and actuator 40 provides the remaining forces.

A mechanic safety device 50 consisting of two overlapping segments 52, 54 and a locking pin 56 can be provided for preventing that table 20 unintentionally returns from the maintenance position into the operating position. Once the maintenance position is reached, locking pin 56 is moved into a locking position in which it prevents that segments 52, 54 can slide one onto the other.

The invention claimed is:

1. A litho laminating machine comprising:
an accelerator table, the accelerator table being moveable between an operating position and a maintenance position, the accelerator table being supported on a frame with a bearing defining a pivot axis; and
a lifting device, the lifting device including a spring element and an actuator,
wherein the spring element biases the accelerator table towards the maintenance position, and the actuator is configured to move the accelerator table from the operating position towards the maintenance position.

2. The litho laminating machine of claim 1, wherein the actuator is a pneumatic piston.

3. The litho laminating machine of claim 1, wherein the actuator engages at the accelerator table in a first distance from the pivot axis, the first distance being a fraction of a second distance between the pivot axis and a center of gravity of the accelerator table.

4. The litho laminating machine of claim 3, wherein the first distance is between 20% to 35% of the second distance.

5. The litho laminating machine of claim 1, wherein a beta angle between a central axis of the actuator and a line passing through the pivot axis and a point of engagement of the actuator and the accelerator table is, in the operating position of the accelerator table, greater than 90° and, in the maintenance position, less than 90°.

6. The litho laminating machine of claim 1, wherein the spring element is a gas spring.

7. The litho laminating machine of claim 3, wherein the spring element engages at the accelerator table at a third distance from the pivot axis, the third distance being more than twice of the first distance.

8. The litho laminating machine of claim 1, wherein an alpha angle between a central axis of the spring element and a line passing through the pivot axis and a point of engagement of the spring element with the accelerator table is, in the operating position of the accelerator table, less than 90°.

9. The litho laminating machine of claim 1, wherein the actuator is a first actuator,
the spring element is a first spring element,
the litho laminating machine further includes a second actuator and a second spring element,
a first one of the first actuator and the second actuator and a first one of the first spring element and the second spring element are arranged at a first lateral side of the accelerator table, and
a second one of the first actuator and the second actuator and a second one of the first spring element and the second spring element are arranged at a second lateral side of the accelerator table.

10. A litho laminating machine comprising:
an accelerator table being movable, via a minimum required moving force, from an operating position to a maintenance position;
a spring element that biases the accelerator table towards the maintenance position with a biasing force less than the minimum required moving force; and
an actuator configured to move the accelerator table from the operating position to the maintenance position with an actuator force less than the minimum required moving force.

11. The litho laminating machine of claim 10, wherein the actuator force plus the biasing force is greater than the minimum required moving force.

12. The litho laminating machine of claim 10, wherein the spring element and the actuator are provided below the accelerator table, and the operating position of the accelerator table is lower than the maintenance position.

13. A litho laminating machine comprising:
an accelerator table being pivotable about a pivot axis between an operating position and a maintenance position;
a spring element that biases the accelerator table towards the maintenance position; and
an actuator configured to move the accelerator table from the operating position to the maintenance position, wherein the actuator engages the accelerator table between the pivot axis and a point of engagement of the spring element with the accelerator table.

14. The litho laminating machine of claim 13, wherein a longitudinal axis of the spring element crosses a longitudinal axis of the actuator from a transverse viewpoint relative to the accelerator table.

15. The litho laminating machine of claim 13, wherein in the operating position, an angle alpha between a longitudinal axis of the spring element and a line passing through the pivot axis and a point of engagement of the spring element on the accelerator table is less than an angle beta between a longitudinal axis of the actuator and a point of engagement of the actuator on the accelerator table.

16. The litho laminating machine of claim 15, wherein in the operating position, the angle alpha is less than 90 degrees, and the angle beta is more than 90 degrees.

17. The litho laminating machine of claim 13, wherein the spring element and the actuator are configured to be extended in the maintenance position and retracted in the operating position.

18. The litho laminating machine of claim 13, wherein each of the spring element and the actuator provide a force less than a minimum required moving force to move the accelerator table from the operating position to the maintenance position.

* * * * *